(12) United States Patent
Sama et al.

(10) Patent No.: US 12,143,809 B2
(45) Date of Patent: Nov. 12, 2024

(54) NETWORK FUNCTION DATABASE, MOBILE COMMUNICATION NETWORK COMPONENT, METHOD FOR SELECTING A NETWORK FUNCTION AND METHOD FOR REGISTERING A NETWORK FUNCTION

(71) Applicant: NTT DOCOMO, INC., Tokyo (JP)

(72) Inventors: Malla Reddy Sama, Munich (DE); Srisakul Thakolsri, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 405 days.

(21) Appl. No.: 17/441,468

(22) PCT Filed: Feb. 11, 2020

(86) PCT No.: PCT/EP2020/053447
§ 371 (c)(1),
(2) Date: Sep. 21, 2021

(87) PCT Pub. No.: WO2020/192997
PCT Pub. Date: Oct. 1, 2020

(65) Prior Publication Data
US 2022/0159536 A1    May 19, 2022

(30) Foreign Application Priority Data
Mar. 22, 2019   (EP) .................................. 19164640

(51) Int. Cl.
*H04W 8/06* (2009.01)
*H04W 36/14* (2009.01)
*H04W 36/18* (2009.01)

(52) U.S. Cl.
CPC ........... *H04W 8/06* (2013.01); *H04W 36/142* (2023.05); *H04W 36/18* (2013.01)

(58) Field of Classification Search
CPC ....... H04W 36/14; H04W 36/18; H04W 8/00; H04W 8/06; H04W 8/065; H04W 8/10; H04W 8/12; H04W 8/20
See application file for complete search history.

(56) References Cited

U.S. PATENT DOCUMENTS 10,848,576 B2 * 11/2020 Stammers ............... H04L 67/51
11,258,822 B2 *  2/2022 Han ........................ H04L 61/00
(Continued)

FOREIGN PATENT DOCUMENTS

JP        2019520766 A      7/2019

OTHER PUBLICATIONS

Office Action issued in Japanese Application No. 2020-532929; Dated Mar. 22, 2022 (9 pages).
(Continued)

*Primary Examiner* — Siu M Lee
(74) *Attorney, Agent, or Firm* — Osha Bergman Watanabe & Burton LLP

(57) ABSTRACT

According to one embodiment, a network function database of a mobile communication network is described comprising a memory configured to store, for a network function or service of the mobile communication network, an indication that the network function or service is configured to take over serving mobile terminals served by one of one or more other mobile communication networks, a receiver configured to receive, from another mobile radio communication network, a request for selecting a network function or service to take over serving a mobile terminal served by the other mobile communication network and a selector configured to select the network function or service for taking over serving the mobile terminal for which the memory stores the indication that the network function or service is configured to take over serving mobile terminals served by one of one (Continued)

or more other mobile communication networks if the one or more other mobile communication networks include the other mobile communication network serving the mobile terminal.

14 Claims, 8 Drawing Sheets

(56) References Cited

U.S. PATENT DOCUMENTS

| | | | | |
|---|---|---|---|---|
| 11,750,708 | B2* | 9/2023 | Yao | H04L 67/51 |
| | | | | 709/220 |
| 2020/0028920 | A1* | 1/2020 | Livanos | H04W 8/26 |
| 2020/0177677 | A1* | 6/2020 | Yang | H04L 67/51 |
| 2020/0358657 | A1 | 11/2020 | Xu et al. | |
| 2023/0156580 | A1* | 5/2023 | Rommer | H04W 76/00 |
| | | | | 370/328 |

OTHER PUBLICATIONS

Extended European Search Report issued in counterpart European Patent Application No. 22167342.9, mailed on Aug. 4, 2022 (11 pages).

3GPP TS 23.502 Draft V16.0.0+; "3rd Generation Partnership Project; Technical Specification Group Services and System Aspects; Procedures for the 5G System; Stage 2 (Release 16)"; Feb. 2019 (378 pages).

3GPP TS 29.510 V15.2.0; "3rd Generation Partnership Project; Technical Specification Group Core Network and Terminals; 5G System; Network Function Repository Services; Stage 3 (Release 15)"; Dec. 2018 (107 pages).

3GPP TSG-SA WG2 Meeting #131; S2-1902709 "S-NSSAIs used for AMF selection during inter PLMN mobility" Huawei, Hisilicon; Santa Cruz, Spain; Feb. 25-Mar. 1, 2019 (3 pages).

Office Action issued in Japanese Application No. 2020-532929; Dated Aug. 31, 2021 (6 pages).

International Search Report issued in PCT/EP2020/053447, mailed on Feb. 11, 2020 (4 pages).

Written Opinion of the International Searching Authority issued in PCT/EP2020/053447, mailed on Feb. 11, 2020 (13 pages).

3GPP TR 29.891 V15.0.0; "3rd Generation Partnership Project; Technical Specification Group Core Network and Terminals; 5G System—Phase 1; CT WG4 Aspects (Release 15)"; Dec. 2017 (145 pages).

3GPP TS 23.501 V15.5.0; "3rd Generation Partnership Project; Technical Specification Group Services and System Aspects; System Architecture for the 5G System; Stage 2 (Release 15)"; Mar. 2019 (240 pages).

Office Action issued in counterpart Chinese Patent Application No. 202080035716.9 mailed on Sep. 27, 2023 (16 pages).

* cited by examiner

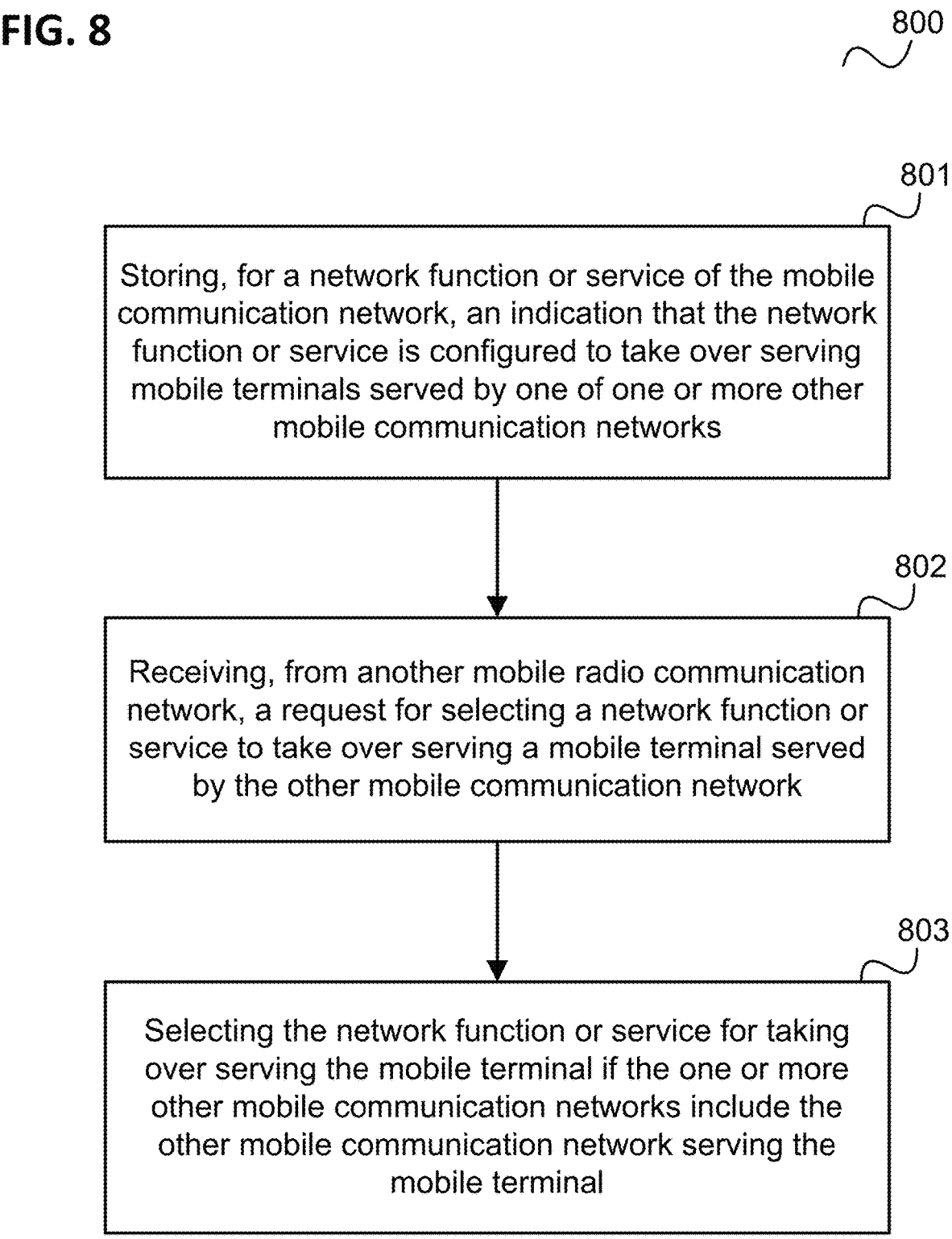

NETWORK FUNCTION DATABASE, MOBILE COMMUNICATION NETWORK COMPONENT, METHOD FOR SELECTING A NETWORK FUNCTION AND METHOD FOR REGISTERING A NETWORK FUNCTION

The present disclosure relates to network function and/or service databases, mobile communication network components, methods for selecting a network function or service and methods for registering a network function.

Handing over a mobile terminal from one mobile communication network to another mobile communication network is a typical functionality of mobile communication networks to ensure inter-network mobility. This is typically done when the mobile terminal leaves the coverage area of one mobile communication network, e.g. when leaving a country.

To ensure service continuity, it is typically necessary to find and select network functions or services of a mobile communication network for taking over serving a mobile terminal currently served by another mobile communication network. However, not all network functions or services may be able to take over serving a mobile terminal currently served by another mobile communication network. For example, it may be necessary that the network function or service has a suitable interface to the other mobile communication network, e.g. for receiving a context of the mobile terminal from the other mobile communication network.

Accordingly, efficient approaches for selecting network functions or service of a mobile communication network for taking over serving a mobile terminal from another mobile communication network are desirable.

According to one embodiment, a network function database of a mobile communication network is provided including a memory configured to store, for a network function of the mobile communication network, an indication that the network function is configured to take over serving mobile terminals served by one of one or more other mobile communication networks, a receiver configured to receive, from another mobile radio communication network, a request for selecting a network function or service to take over serving a mobile terminal served by the other mobile communication network and a selector configured to select the network function or service for taking over serving the mobile terminal for which the memory stores the indication that the network function or service is configured to take over serving mobile terminals served by one of one or more other mobile communication networks if the one or more other mobile communication networks include the other mobile communication network serving the mobile terminal.

According to further embodiments, a mobile communication network components, a method for selecting a network function and a method for registering a network function according to the above network function database are provided.

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 8 shows a flow diagram illustrating a method for selecting a network function of the mobile communication network.

Figure 1:
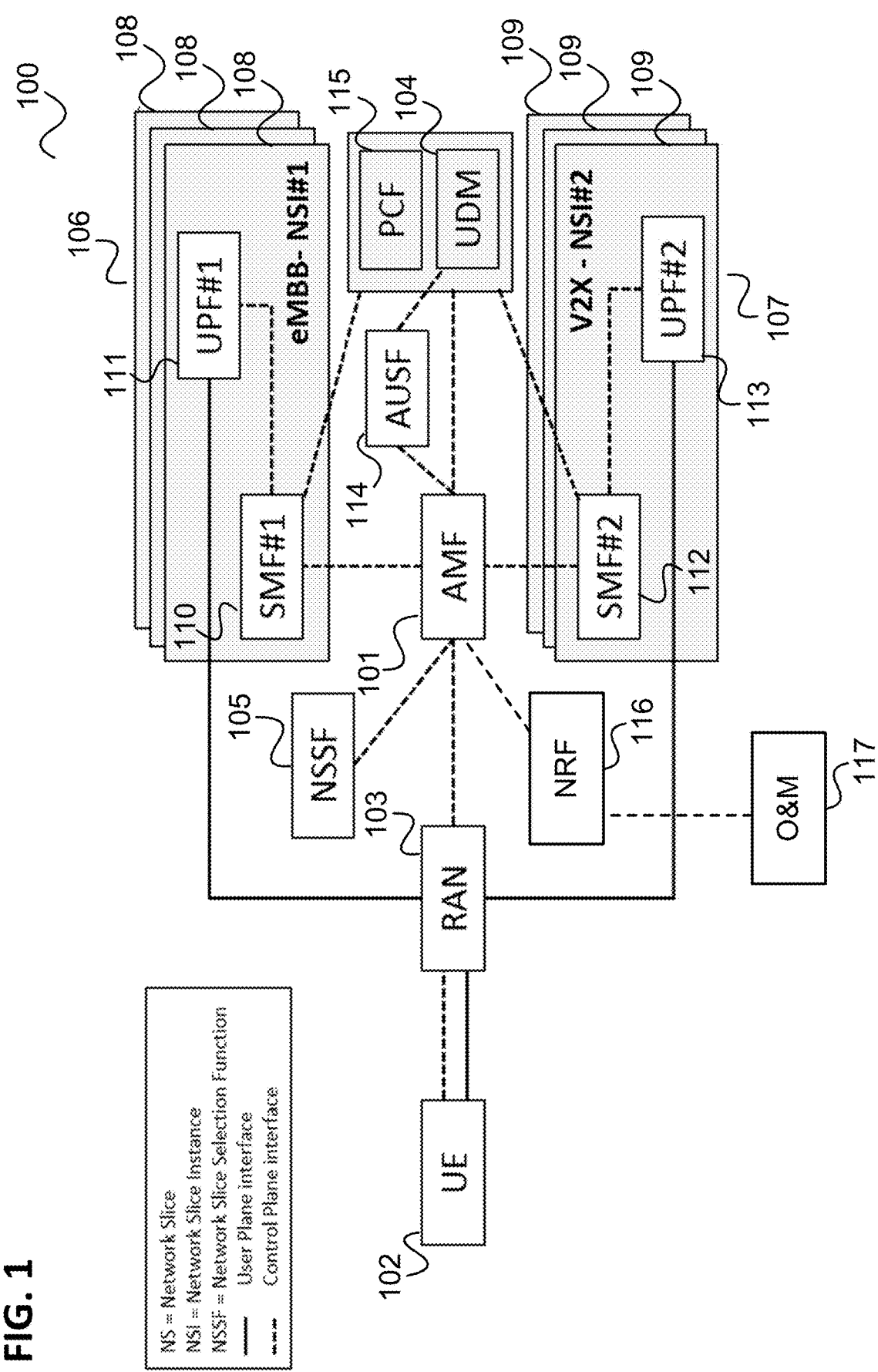
FIG. 1 shows a mobile communication system.

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Various examples corresponding to aspects of this disclosure are described below:

Example 1 is a network function database of a mobile communication network including a memory configured to store, for a network function or service of the mobile communication network, an indication that the network function or service is configured to take over serving mobile terminals served by one of one or more other mobile communication networks, a receiver configured to receive, from another mobile radio communication network, a request for selecting a network function or service to take over serving a mobile terminal served by the other mobile communication network, a selector configured to select the network function or service for taking over serving the mobile terminal, for which the memory stores the indication that the network function or service is configured to take over serving mobile terminals served by one of one or more other mobile communication networks if the one or more other mobile communication networks include the other mobile communication network serving the mobile terminal.

Example 2 is the network function database of Example 1, further including a determiner configured to determine whether the one or more other mobile communication networks include the other mobile communication network serving the mobile terminal.

Example 3 is the network function database of Example 1 or 2, wherein the indication that the network function or service is configured to take over serving mobile terminals served by one of one or more other mobile communication networks includes a list of identifications of the one or more other mobile communication networks.

Example 4 is the network function database of Example 1 or 2, wherein the indication that the network function or service is configured to take over serving mobile terminals served by one of one or more other mobile communication networks includes an indication that the network function is a default network function for taking over serving mobile terminals served by other mobile communication networks.

Example 5 is the network function database of Example 1 or 2, wherein the indication that the network function or service is configured to take over serving mobile terminals served by one of one or more other mobile communication networks includes an indication that the network function includes an interface to the one or more other mobile communication networks.

Example 6 is the network function database of Example 1 or 2, wherein the indication that the network function or service is configured to take over serving mobile terminals served by one of one or more other mobile communication networks includes a list of identifications of supported slices of the one or more other mobile communication networks.

Example 7 is the network function database of any one of Examples 1 to 6, wherein the selector is configured to search the memory for a network function or service for which it is indicated that the network function or service is configured to take over serving mobile terminals served by the other mobile communication networks and select a network function or service found as network function to take over serving the mobile terminal.

Example 8 is the network function database of any one of Examples 1 to 7, wherein the selector is configured to search the memory for a network function or service for which it is indicated that the network function or service is configured to take over serving mobile terminals served by the other mobile communication networks by means of a list of identifications including an identification of the other mobile communication network or an identification of a slice of the other mobile communication network and select a network function found as network function or service to take over serving the mobile terminal.

Example 9 is the network function database of Example 8, wherein the selector is configured to search, if it cannot find a network function for which it is indicated that the network function is configured to take over serving mobile terminals served by the other mobile communication networks by means of a list of identifications including the other mobile communication network, a network function for which it is indicated that the network function is a default network function for taking over serving mobile terminals served by other mobile communication networks.

Example 10 is the network function database of any one of Examples 1 to 9, wherein the network function is an Access and Mobility Management Function of the mobile communication network.

Example 11 is the network function database of any one of Examples 1 to 10, wherein the mobile communication network, the one or more other mobile communication networks and the other mobile communication network serving the mobile terminal are visited networks of the mobile terminal or includes visited networks and a home network of the mobile terminal.

Example 12 is the network function database of any one of Examples 1 to 11, wherein the other mobile communication network serves the mobile terminal by means of a home routed session or a local breakout session.

Example 13 is the network function database of any one of Examples 1 to 12, wherein the network function data base is a network repository function or a service communication proxy or a discovery function or a service repository.

Example 14 is the network function database of any one of Examples 1 to 13, wherein the receiver is configured to receive the request from another network function database of the other mobile radio communication network.

Example 15 is the network function database of Example 14, wherein the other network function database is a network repository function or a service communication proxy or a discovery function of the other mobile radio communication network.

Example 16 is the network function database of any one of Examples 1 to 15, wherein the receiver is configured to receive the indication that the network function is configured to take over serving mobile terminals served by the one or more other mobile communication networks from the network function or an Operation and Maintenance system of the mobile communication network.

Example 17 is the network function database of any one of Examples 1 to 16, wherein the receiver is configured to receive the indication that the network function is configured to take over serving mobile terminals served by the one or more other mobile communication networks by means of a network function profile or service profile.

Example 18 is the network function database of any one of Examples 1 to 17, wherein the receiver is configured to receive the indication that the network function is configured to take over serving mobile terminals served by the one or more other mobile communication networks by means of a request to register the network function in the network function database.

Example 19 is the network function database of any one of Examples 1 to 18, wherein the memory is configured to store the indication that the network function is configured to take over serving mobile terminals served by the one or more other mobile communication networks by means of a network function profile for the network function.

Example 20 is the network function database of any one of Examples 1 to 19, including a transmitter configured to, if the selector has selected the network function for taking over serving the mobile terminal, transmit an indication of the network function as network function to take over serving the mobile terminal to the other mobile communication network.

Example 21 is a method for selecting a network function of the mobile communication network including storing, for a network function or service of the mobile communication network, an indication that the network function or service is configured to take over serving mobile terminals served by one of one or more other mobile communication networks, receiving, from another mobile radio communication network, a request for selecting a network function or service to take over serving a mobile terminal served by the other mobile communication network and selecting the network function or service, for which the indication that the network function or service is configured to take over serving mobile terminals served by one of one or more other mobile communication networks is stored, for taking over serving the mobile terminal if the one or more other mobile communication networks include the other mobile communication network serving the mobile terminal.

Example 22 is a component of a mobile communication network including a transmitter, configured to, for a network function or service configured to take over serving mobile terminals served by one of one or more other mobile communication networks, transmit, to a network function database for providing information about network functions or services of the mobile communication network to other mobile communication networks, an indication that the network function or service is configured to take over serving mobile terminals served by one of the one or more other mobile communication networks.

Example 23 is the mobile communication network component of Example 22, wherein the component is the network function of the mobile communication network.

Example 24 is the mobile communication network component of Examples 22 or 23, wherein the network function is configured to register with the network function database.

Example 25 is the mobile communication network component of Example 22, wherein the component is an operation and maintenance system of the mobile communication network.

Example 26 is the mobile communication network component of any one of Examples 22 to 25, wherein the indication that the network function is configured to take over serving mobile terminals served by one of one or more other mobile communication networks includes a list of identifications of the one or more other mobile communication networks.

Example 27 is the mobile communication network component of any one of Examples 22 to 25, wherein the indication that the network function is configured to take over serving mobile terminals served by one of one or more other mobile communication networks includes an indication that the network function is a default network function for taking over serving mobile terminals served by other mobile communication networks.

Example 28 is the mobile communication network component of any one of Examples 22 to 25, wherein the indication that the network function is configured to take over serving mobile terminals served by one of one or more other mobile communication networks includes an indication that the network function includes an interface to the one or more other mobile communication networks.

Example 29 is the mobile communication network component of any one of Examples 22 to 25, wherein the indication that the network function or service is configured to take over serving mobile terminals served by one of one or more other mobile communication networks includes a list of identifications of supported slices of the one or more other mobile communication networks.

Example 30 is the mobile communication network component of any one of Examples 22 to 29, wherein the transmitter is configured to transmit the indication that the network function is configured to take over serving mobile terminals served by the one or more other mobile communication networks by means of a network function profile or service profile.

Example 31 is the mobile communication network component of any one of Examples 22 to 30, wherein the transmitter is configured to transmit the indication that the network function is configured to take over serving mobile terminals served by the one or more other mobile communication networks by means of a request to register the network function in the network function database.

Example 32 is a method for registering a network function in a network function database including transmitting, to a network function database for providing information about network functions of the mobile communication network to other mobile communication networks, an indication that the network function is configured to take over serving mobile terminals served by one of one or more other mobile communication networks.

According to a further Example, a network function database of a mobile communication network is provided including a memory configured to store, for each network function of a set of network functions of the mobile communication network, information specifying for which other mobile communication networks the network function supports taking over serving a mobile terminal and a selector configured to select a network function for taking over a mobile terminal from another mobile communication network based on the information stored by the memory for the set of network functions.

It should be noted that one or more of the features of any of the examples above may be combined with any one of the other examples. In particular, Examples described in context of a network component may be analogously applied to the methods.

In the following, various examples will be described in more detail.

FIG. 1 shows a mobile communication system 100.

The mobile communication system 100 includes a mobile radio terminal device 102 such as a UE (user equipment), a nano equipment (NE), and the like. The mobile radio terminal device 102, also referred to as subscriber terminal, forms the terminal side while the other components of the mobile communication system 100 described in the following are part of the mobile communication network side, i.e. part of a mobile communication network (e.g. a Public Land Mobile Network—PLMN).

Furthermore, the mobile communication system 100 includes a radio access network 103, which may include a plurality of radio access network nodes, i.e. base stations configured to provide radio access in accordance with a 5G (Fifth Generation) radio access technology (5G New Radio). It should be noted that the mobile communication system 100 may also be configured in accordance with LTE (Long Term Evolution) or Wi-Fi (radio wireless local area networking) or another mobile communication standard but 5G is herein used as an example. Each radio access network node may provide a radio communication with the mobile radio terminal device 102 over an air interface. It should be noted that the radio access network 103 may include any number of radio access network nodes.

The mobile communication system 100 further includes a core network including an Access and Mobility Management Function (AMF) 101 connected to the RAN 103, a Unified Data Management (UDM) 104 and a Network Slice Selection Function (NSSF) 105. Here and in the following examples, the UDM may further consist of the actual UE's subscription database, which is known as, for example, the UDR (Unified Data Repository). The core network further includes an AUSF (Authentication Server Function) 114 and a PCF (Policy Control Function) 115.

The core network of the mobile communication system 100 further includes a network repository function 116 to which (at least) the AMF 101 is connected.

The mobile communication system 100 may further include an O&M (Operations and Maintenance) system 117 connected to (at least) the NRF 116. The O&M system 117 may for example correspond to an OSS/BSS System (Operations Support System/Business Support System) including for example a Service Management Function (SerMF) and a Network Slice Management Function (NSMF).

The core network may have multiple (core) network slices 106, 107 and for each network slice 106, 107, the operator may create multiple network slice instances (NSIs) 108, 109. In this example, the core network includes a first core network slice 106 with three core network slice instances (CNIs) 108 for providing Enhanced Mobile Broadband (eMBB) and a second core network slice 107 with three core network slice instances (CNIs) 109 for providing Vehicle-to-Everything (V2X).

Typically, when a network slice is deployed, network functions (NFs) are instantiated, or (if already instantiated) referenced to form a network slice instance (NSI) and network functions that belong to a network slice instance are configured with a network slice instance identification.

Specifically, in this example, each instance 108 of the first core network slice 106 includes a first Session Management Function (SMF) 110 and a first User Plane Function (UPF) 111 and each instance 109 of the second core network slice 107 includes a second Session Management Function (SMF) 112 and a second User Plane Function (UPF) 113.

A user of a mobile terminal 102 typically has a subscription for a certain communication network, i.e. a contract with an operator of a communication network (e.g. corresponding to the network side of the communication system 100, i.e. the communication system 100 without the UE 102). That communication network is his home network, e.g. HPLMN (Home Public Land Mobile Network).

When being out of the coverage area of his home network, a user may use a communication network of a different operator, for example when he/she is in another country than his/her home country, which then acts as visited network for the user. Or within a country, he/she is connected to another PLMN then the subscribed PLMN.

Further, when a mobile terminal being served by a communication network (be it the home network of its user or a visited network) and leaving the coverage area of the communication network, a handover of the mobile terminal to another communication network (e.g. another visited network) may be performed.

Figure 2:
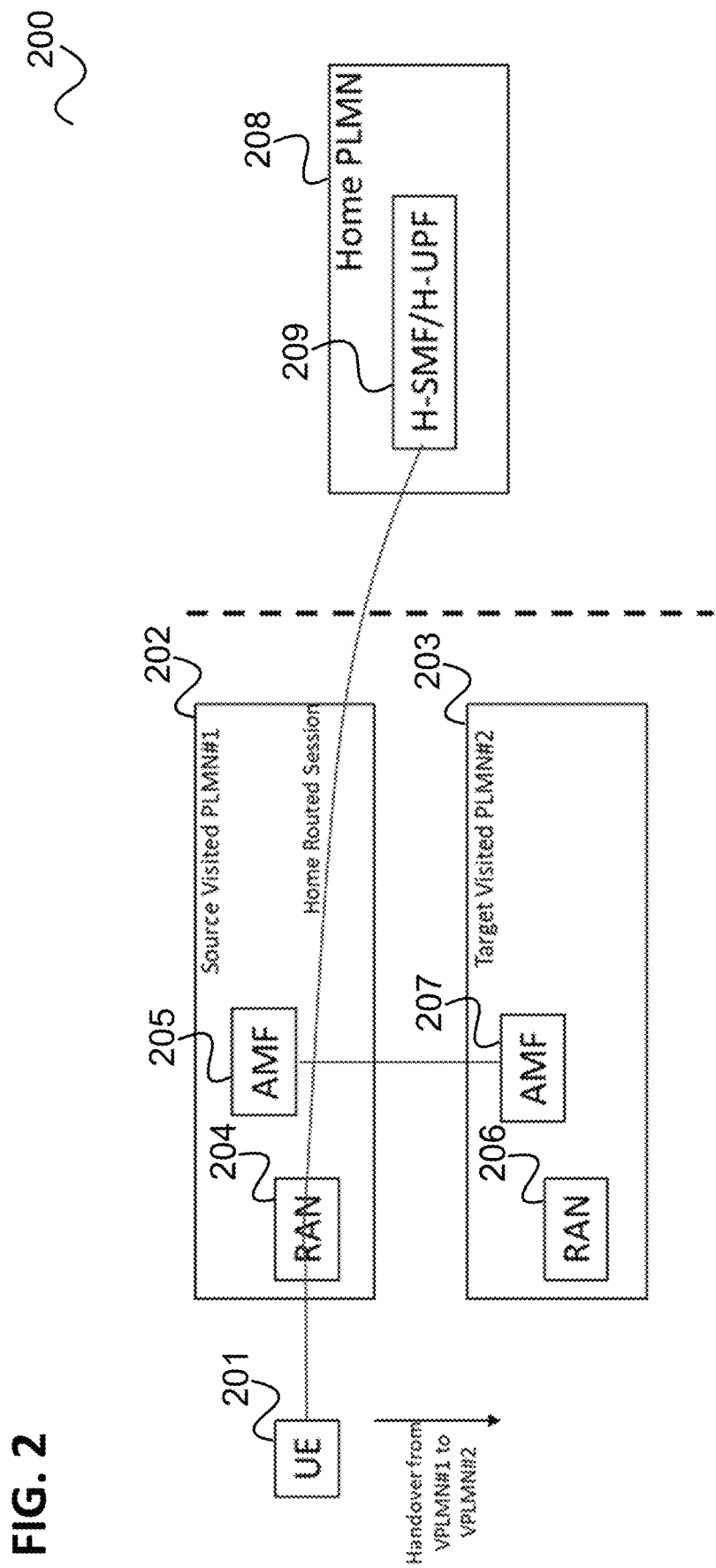
FIG. 2 shows a communication arrangement illustrating a handover of a mobile terminal from a first visited PLMN (Public Land Mobile Network) to a second visited PLMN providing the mobile terminal with inter-PLMN mobility.

FIG. 2 shows a communication arrangement 200 illustrating a handover of a mobile terminal 201 from a first visited PLMN 202 to a second visited PLMN 203 for providing the mobile terminal (e.g. UE) 201 with inter-PLMN mobility.

The first visited PLMN (VPLMN) 201 includes a first RAN 204, a first AMF 205 and other functions and similarly, the second VPLMN 202 includes a second RAN 206, a second AMF 207 and other functions as described with reference to FIG. 1.

Before the handover, the mobile terminal 201 has a home routed session (e.g. a PDU, Protocol Data Unit, session) via the first VPLMN 201. This means that the mobile terminal 201 has a communication session via the first RAN 204 and the first AMF 205 which is routed to the mobile terminal's (i.e. its user's) home PLMN (HPLMN) 208, specifically to a home SMF (H-SMF) and/or home UPF (H-UPF) 209 of the HPLMN 208.

For performing a handover of the mobile terminal 201, e.g. due to the fact that the mobile terminal 201 loses coverage of the first RAN 204, the first AMF 205, being the source AMF in the handover scenario, needs to know a (target) AMF of the target VPLMN (i.e. the second VPLMN 203). A (source) NRF of the first VPLMN 201 may request a (target) NRF of the second VPLMN 202 for a target AMF. However, a mechanism is needed According to which the target NRF selects a target AMF to enable UE context transfer between the VPLMNs 202, 203.

Figure 3:
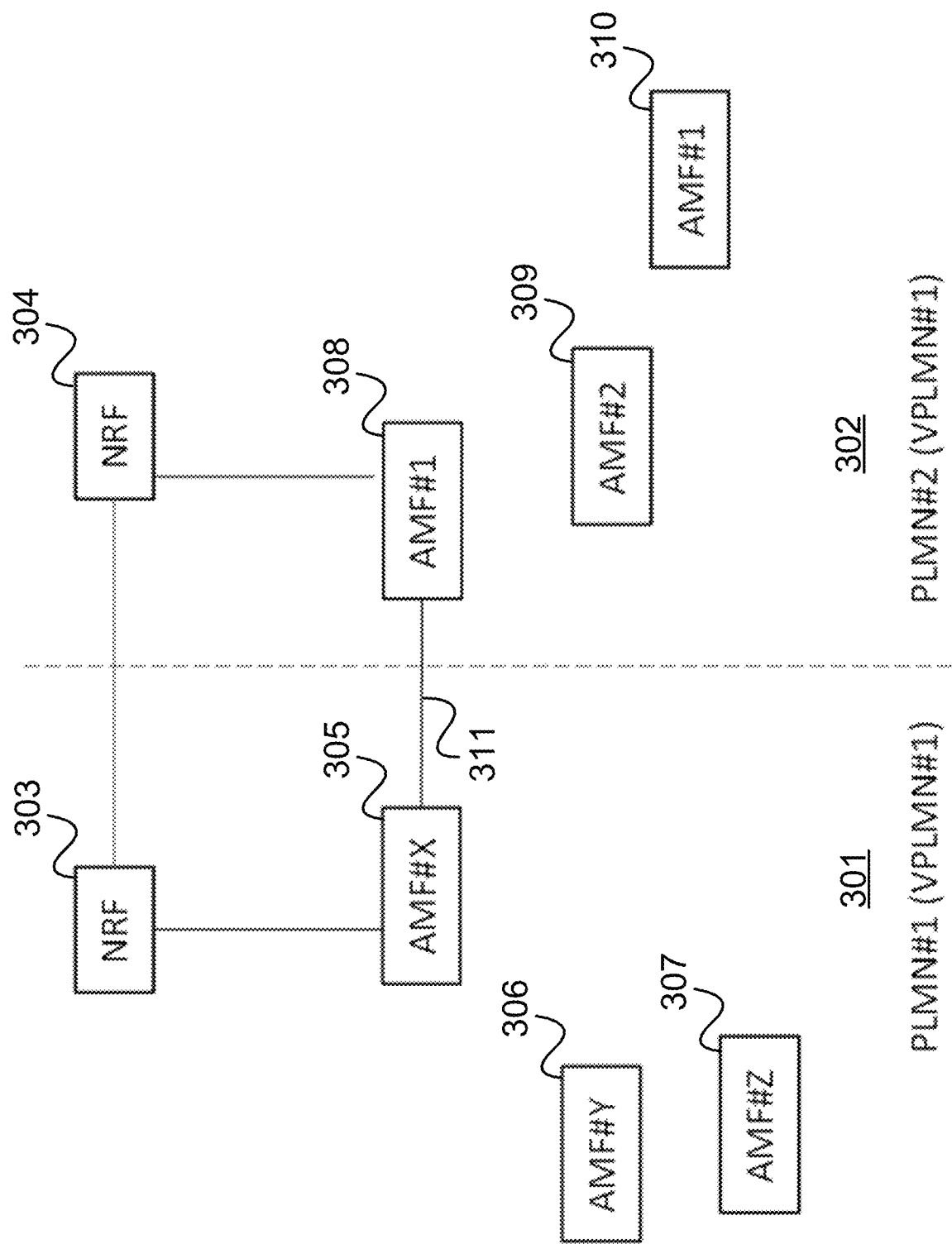
FIG. 3 shows components of a first VPLMN (visited PLMN) and a second VPLMN.

Both the source VPLMN 201 as well as the target VPLMN 202 may have multiple AMFs as illustrated in FIG. 3.

FIG. 3 shows components of a first VPLMN 301 and a second VPLMN 302.

The first VPLMN 301 has a first NRF 303 and the second VPLMN 302 has a second NRF 304. The first VPLMN 301 includes a first AMF 305, a second AMF 306 and a third AMF 307. The second VPLMN 302 includes a fourth AMF 308, a fifth AMF 309 and a sixth AMF 310.

Typically, one or more AMFs of a PLMN have a link (i.e. an N14 interface) with other AMFs in another PLMN. In the example of FIG. 3, the first AMF 305 has a link 311 (a connection via a N14 interface) to the fourth AMF 308. The other AMFs 306, 307, 309, 310 do for example not have a connection to an AMF of the respective other VPLMN 301, 302.

Each AMF (or AMF instance) may have different capabilities in a PLMN. For example, AMFs of the same PLMN do not necessarily support the same set of network slices.

Typically, a network operator does not want to expose all topology information (such as information about all existing NFs) of his PLMN to the operator (or users) of another PLMN due to security reasons. An operator may therefore choose the deployment option to create default network functions as an entry point for a UE. The UE may then, after initially using the default network functions, be relocated (re-allocated) to dedicated network functions (or a dedicated network slice).

According to 3GPP (Third Generation Partnership Project) Release 15, a NF service consumer (i.e. herein for example an NF instance such as an AMF, an SMF, a UDM etc.) may perform NF Service Registration. For this, the NF service consumer of a PLMN, sends an Nnrf_NFManagement_NFRegister Request message to an NRF of the PLMN to inform the NRF of its NF profile when the NF service consumer becomes operative for the first time.

According to 3GPP, the NF Profile includes:
Inputs, Required: NF type, NF instance ID, Names of supported NF services (if applicable) and PLMN ID e.g. if NF needs to be discovered by other PLMNs.
Inputs, Optional:
  If the consumer NF stores Data Set(s) (e.g. UDR): Range(s) of SUPIs (Subscription Concealed Identifiers), range(s) of GPSIs (Generic Public Subscription Identifiers), range(s) of external group identifiers, Data Set Identifier(s). If the consumer is BSF (Binding Support Function): Range(s) of (UE) IPv4 addresses or Range(s) of (UE) IPv6 prefixes.
  If the consumer is UDM, UDR or AUSF, they can include UDM Group ID, UDR Group ID, AUSF Group ID.
  For UDM and AUSF, Routing IDIndicator.
  If the consumer is AMF, it includes list of GUAMI(s). In addition, AMF may include list of GUAMI(s) (Global Unique AMF ID) for which it can serve as backup for failure/maintenance.
  If the consumer is CHF (Charging Function), it may include Range(s) of SUPIs, Range(s) of GPSIs, or Range(s) of PLMNs.
  For the "UPF Management" service: UPF Provisioning Information.
  S-NSSAI(s) (Single Network Slice Selection Assistance Information) and the associated NSI ID(s) (if available).
  Information about the location of the NF consumer (operator specific information, e.g. geographical location, data centre).
  TAI(s) (Tracking Area Identity).

Alternatively, the NF service consumer's NF profile can also be configured by the O&M system in the NRF.

Further, according to 3GPP, in case of inter PLMN mobility, the source AMF may select an AMF instance(s) in the target PLMN from a list of discovered AMF instances provided via PLMN level NRF interactions.

For such an NF service discovery across PLMNs a NF service consumer in the serving PLMN (i.e. source PLMN) invokes a Nnrf_NFDiscovery_Request (with the parameters Expected Service Name, NF type of the expected NF, home PLMN ID, serving PLMN ID and NF type of the NF service consumer) to an appropriate configured NRF in the serving PLMN.

The NRF in the serving PLMN identifies NRF in the home PLMN based on the home PLMN ID, and it requests an "NF Discovery" service from NRF in home PLMN to get the expected NF profile(s) of the NF instance(s) deployed in the home PLMN.

The serving NRF provides a list of discovered NF instances to the NF consumer.

However, this still leaves open how the NRF in the target PLMN selects an AMF for a handover (e.g. filters an AMF instance list) for serving a UE handed over from a source PLMN.

Another approach for inter PLMN mobility is that the source AMF selects an AMF in the target PLMN via the PLMN level NRF based on the target PLMN ID and Allowed NSSAI. However, the issue of AMF selection in the target PLMN remains because for example the Allowed NSSAI is not valid in the target PLMN.

In view of the above, according to various embodiments, an approach is provided which includes
1. Registration of a network function with its NRF (i.e. an (or the) NRF of the PLMN to which the network function belongs)
2. Discovery and Selection of a target PLMN NF by a serving PLMN.

Figure 4:
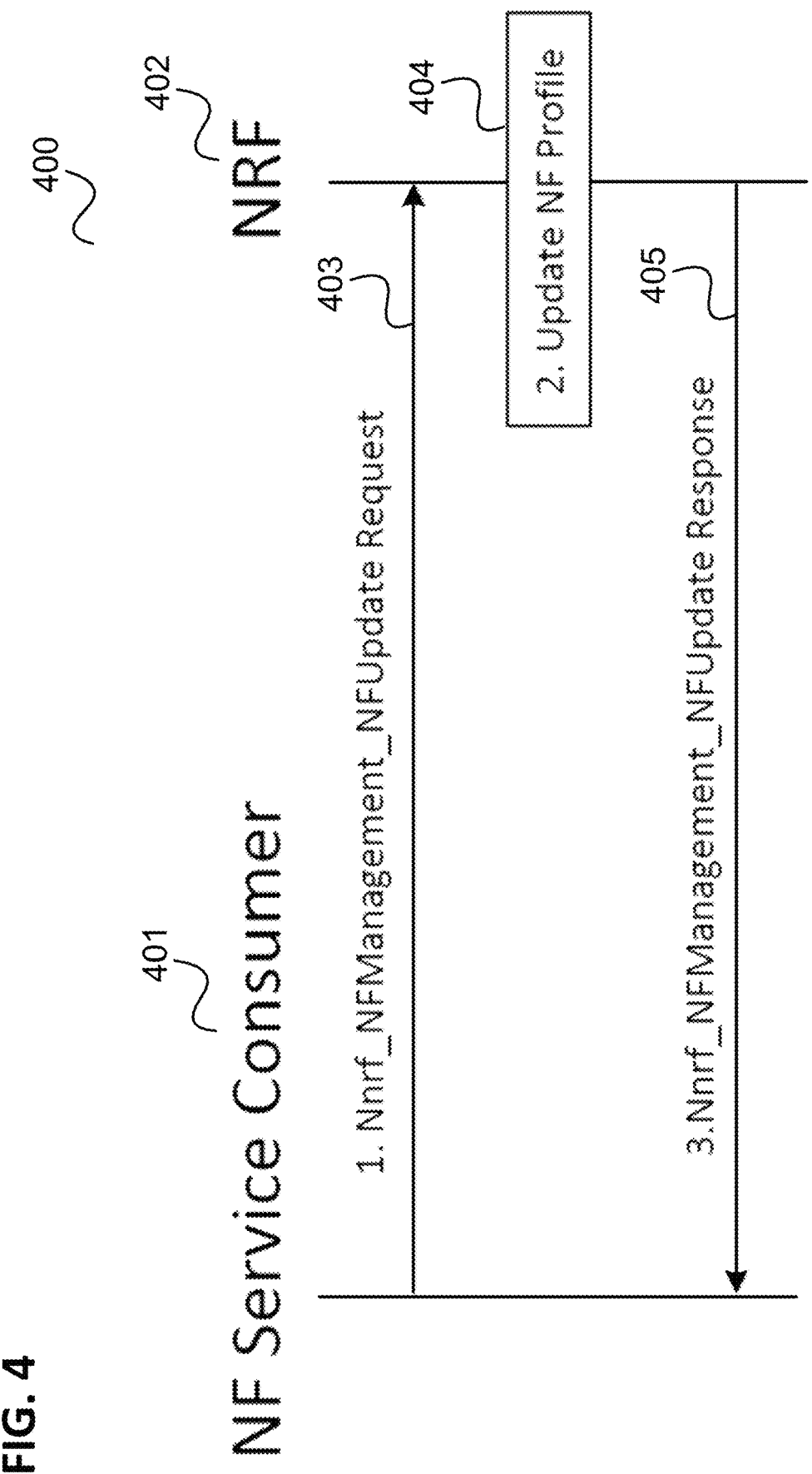
FIG. 4 shows a flow diagram illustrating an NF (network function) Service Consumer registration according to an embodiment.

FIG. 4 shows a flow diagram 400 illustrating an NF service consumer registration according to an embodiment.

An NF Service Consumer 401 and an NRF 402 are involved in the flow.

The NF Service Consumer 401 is a Network Function (or Network Function instance) such as an AMF, an SMF, a UDM etc. e.g. corresponding to the AMF 101, an SMF 110, 112 or the UDM 104 of FIG. 1 or the AMF 207 of the visited PLMN 203 of FIG. 2.

The NRF 402 is an or the NRF of the PLMN to which the NF Service Consumer 401 belongs, e.g. corresponding to NRF 116 of FIG. 1 or an NRF of the visited PLMN 203 of FIG. 2. The NRF 402 is an example of a network function database.

In 403, the NF Service Consumer 401 performs registration (i.e. registers itself) at the NRF 402 by sending an Nnrf_NFManagement_NFUpdate Request message to the NRF 402.

In the registration, the NF Service Consumer 401 indicates its NF profile to the NRF 402. The NF profile includes the following information about the NF:
NF type, NF instance ID, Names of supported NF services (if applicable) and PLMN ID e.g. if NF needs to be discovered by other PLMNs
S-NSSAI(s) and the associated NSI ID(s) (if available).
An indication that the NF Service Consumer is configured to take over serving mobile terminals served by one of one or more other PLMNs (e.g. an AMF configured to take over serving a mobile terminal handed over from one of one or more other PLMNs). This can for example be
An indication of Supported PLMNs (VPLMN IDs), i.e. PLMNs for which the NF Service Consumer is configured to take over serving of mobile terminals
a Default NF indication, i.e. an indication that the NF Service Consumer acts as default serving NF, e.g. for serving mobile terminals of any other PLMN, i.e. for taking over serving mobile terminals served by any other PLMN an "Any PLMN" indication, i.e. an indication that the NF Service Consumer supports serving mobile terminals of any other PLMN, i.e. for taking over serving mobile terminals served by any other PLMN
an "Nxx (e.g. N14) Capability Support" indication, i.e. an indication that the NF Service Consumer (e.g. an AMF) supports a certain interface (e.g. an N14 interface) to the one or more other PLMNs. This may for example include a list of PLMN IDs of PLMNs to which it supports (or has) the interface, i.e. a supported PLMNs list.
Supported Slice Identifications (I.e. S-NSSAIs) of other PLMNs, i.e. list of all S-NSSAIs of other PLMNs. For example, providing other PLMN's S-NSSAIs supported by the service consumer.

In 404 the NRF 403 stores the NF profile.

In 405, the NRF 403 sends an acknowledgement to the NF Service Consumer, e.g. an Nnrf_NFManagement_NFUpdate Response.

For example, based on the operator policy, each NF Service Consumer includes in its NF(service) profile an indication that it can act as a Default function or it can serve certain PLMNs or any PLMN or has "Nxx Capability Support" or an indication of one or more "Supported S-NSSAI of Target PLMN".

According to one embodiment, if the NRF 402 is not able to select/filter the NF Service Procedure, e.g. cannot successfully receive or select the NF Service procedure is configured to take over serving mobile terminals served by one of one or more other PLMNs, it may store for the network function an indication of default function or that it can serve mobile terminals of certain PLMNs or it can serve mobile terminals of any PLMN in the NF Service Procedure profile (NF provide) for NF Service Consumer.

In the example of FIG. 4, the NF Service Consumer registers itself with the NRF. However, this may also be done by an O&M system as illustrated in FIG. 5.

Figure 5:
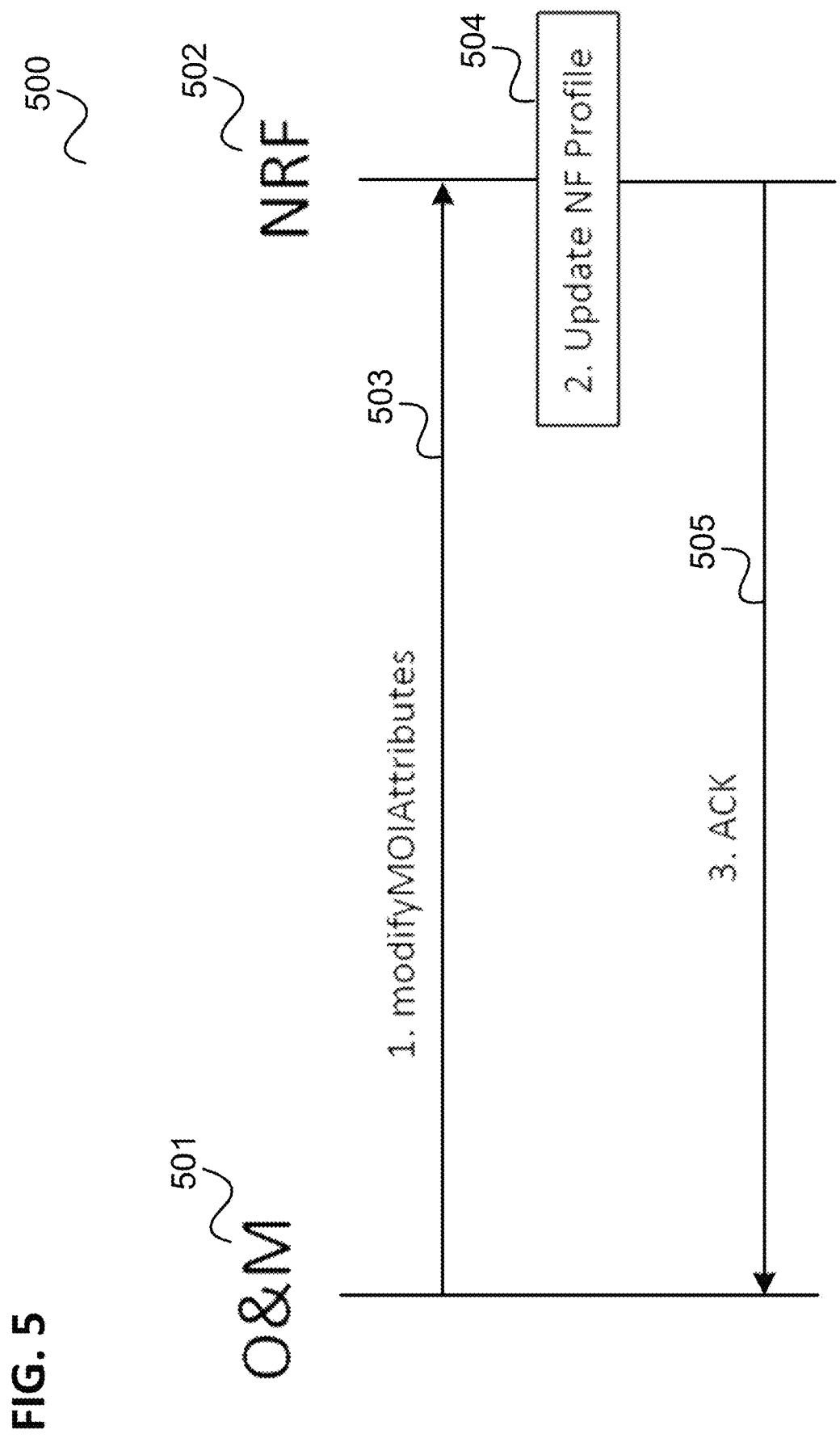
FIG. 5 shows a flow diagram illustrating a registration of a NF Service Consumer by an O&M (Operations and Maintenance) system.

FIG. 5 shows a flow diagram 500 illustrating a registration of a NF Service Consumer by an O&M (Operations and Maintenance) system.

An O&M 501 and an NRF 502 are involved in the flow.

The O&M 501 for example corresponds to the O&M 117. In the flow of FIG. 5, the O&M 501 registers a NF Service Consumer (or, equivalently, the NF profile of the NF Service Consumer) with the NRF 502.

The NF Service Consumer is a Network Function (or Network Function instance) such as an AMF, an SMF, a UDM etc. e.g. corresponding to the AMF 101, an SMF 110, 112 or the UDM 104 of FIG. 1 or the AMF 207 of the visited PLMN 203 of FIG. 2.

The NRF 502 is an or the NRF of the PLMN to which the NF Service Consumer belongs, e.g. corresponding to NRF 116 of FIG. 1 or an NRF of the visited PLMN 203 of FIG. 2.

In 503, the O&M 501 sends an update of NF profile request message, e.g. a modifyMOIAttribute message, to the NRF 502 which includes the following information about the NF:
NF type, NF instance ID, Names of supported NF services (if applicable) and PLMN ID e.g. if NF needs to be discovered by other PLMNs
S-NSSAI(s) and the associated NSI ID(s) (if available).
An indication that the NF Service Consumer is configured to take over serving mobile terminals served by one of one or more other PLMNs (e.g. an AMF configured to take over serving a mobile terminal handed over from one of one or more other PLMNs). This can for example be
- An indication of Supported PLMNs (VPLMN IDs), i.e. PLMNs for which the NF Service Consumer is configured to take over serving of mobile terminals
- a Default NF indication, i.e. an indication that the NF Service Consumer acts as default serving NF, e.g. for serving mobile terminals of any other PLMN, i.e. for taking over serving mobile terminals served by any other PLMN
- an "Any PLMN" indication, i.e. an indication that the NF Service Consumer supports serving mobile terminals of any other PLMN, i.e. for taking over serving mobile terminals served by any other PLMN
- an "Nxx (e.g. N14) Capability Support" indication, i.e. an indication that the NF Service Consumer (e.g. an AMF) supports a certain interface (e.g. an N14 interface) to the one or more other PLMNs. This may for example include a list of PLMN IDs of PLMNs to which it supports (or has) the interface, i.e. a supported PLMNs list.
- Supported Slice Identifications (I.e. S-NSSAIs) of other PLMNs, i.e. list of all S-NSSAIs of other PLMNs. For example, providing other PLMN's S-NSSAIs supported by the service consumer.

In 504 the NRF 503 stores the NF profile.

In 505, the NRF 403 sends an acknowledgement to the O&M.

Figure 6:
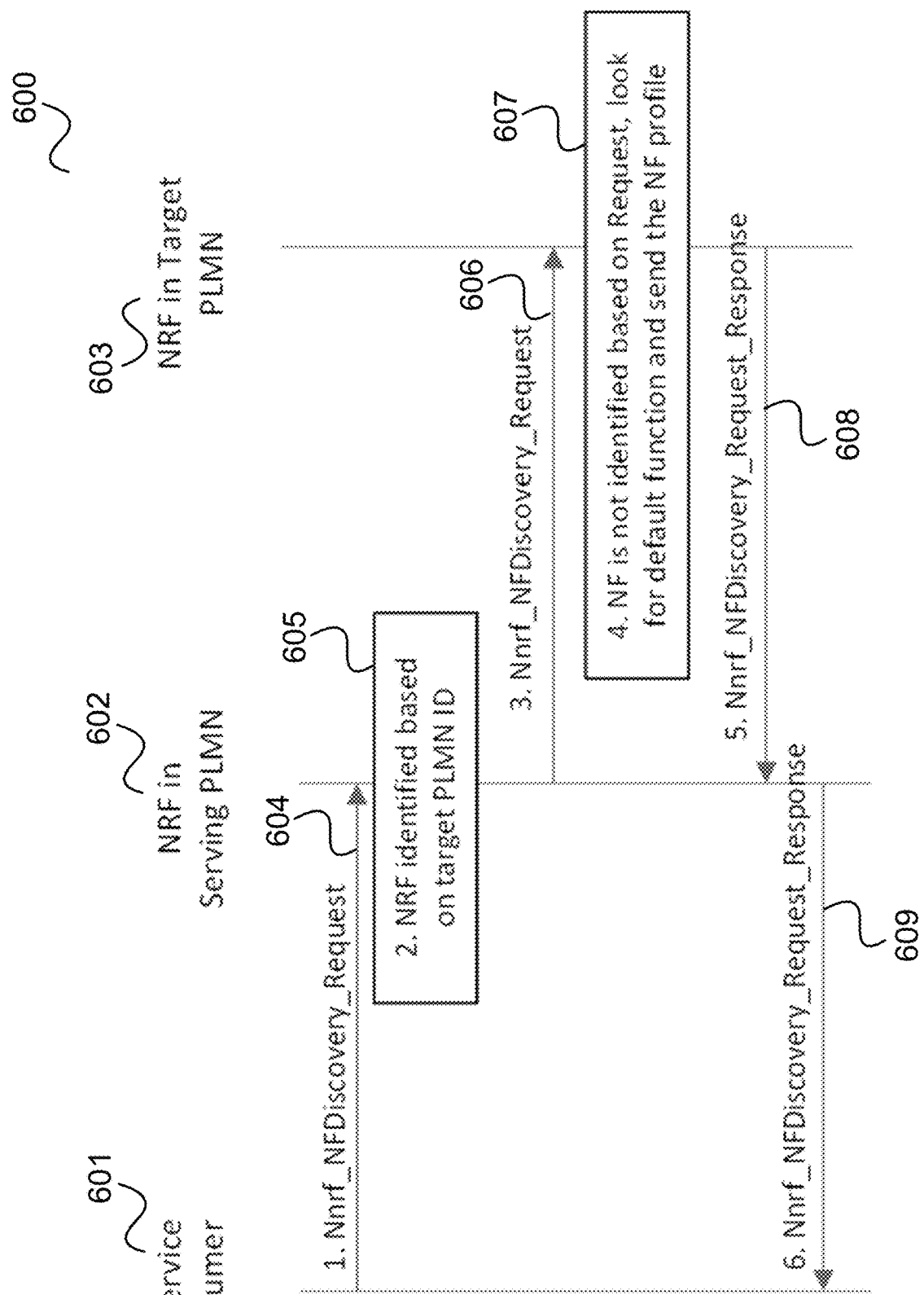
FIG. 6 shows a flow diagram for discovery and selection of an NF Service producer for inter PLMN mobility according to an embodiment.

FIG. 6 shows a flow diagram 600 for discovery and selection of an NF Service producer for inter PLMN mobility according to an embodiment.

As explained with reference to FIG. 2, in an inter PLMN mobility scenario, i.e. a handover of a mobile terminal, there is a source PLMN (e.g. source VPLMN) and a target PLMN (e.g. target VPLMN). The source PLMN (source VPLMN) is also referred to as serving PLMN (serving VPLMN). This refers to the fact that before the handover, the source PLMN (VPLMN) is the PLMN serving the mobile terminal.

An NF Service Consumer 601, a (serving) NRF 602 of the serving PLMN and a (target) NRF 603 of the target PLMN are involved in the flow.

The NF Service Consumer 601 is a Network Function (or Network Function instance or Service Consumer) of the serving PLMN. In this example, the NF Service Consumer 601 may for example be an AMF e.g. corresponding to the AMF 101 of FIG. 1 or the AMF 207 of the source PLMN 202 of FIG. 2.

It is assumed that a mobile terminal is served by source PLMN, specifically by the NF Service Consumer 601 and that a handover of the mobile terminal to the target PLMN is to be performed.

In 604, the NF Service consumer 601 invokes a discovery request by sending an Nnrf_NFDiscovery_Request message to the serving PLMN NRF 602.

For example, the NF Service consumer 601 does this in response to a request (e.g. from the mobile terminal) to perform a handover of the mobile terminal.

The Nnrf_NFDiscovery_Request message includes an indication of an Expected Service Name, an NF type of the expected NF, the PLMN ID of the home ID of the mobile terminal, the PLMN ID of the serving PLMN, the NF type of the NF service consumer 601, and a PLMN ID of the target PLMN (target PLMN ID). In particular, in other words, the Nnrf_NFDiscovery_Request message includes a target NF profile.

In 605, the serving PLMN NRF 602 determines (or selects) the target PLMN NRF 603 based on the target PLMN ID. For example, the FQDN (Fully-Qualified Domain Name) for the NRF 603 of the target PLMN is configured in the serving PLMN NRF 602.

In 606, after the selection of the target PLMN NRF 603, the serving PLMN NRF 602 invokes a discovery request with the target NF profile (it has received in 604) by sending a Nnrf_NFDiscovery_Request message to the target PLMN NRF 603.

In 607, the target PLMN NRF checks whether the NF profile of a NF registered with it (e.g. according to a process as illustrated in FIGS. 4 and 5) matches the target NF profile.

If a NF profile of a NF registered with it matches the target NF profile it selects that NF.

If the NF profile of none of the NF registered with the target NRF 603 matches the target NF profile the target NRF 603 checks whether the NF profile of a NF registered with it indicates that the NF is configured to take over serving mobile terminals served by the source PLMNs. For example, the target NRF 603 checks whether the NF profile of a NF registered with it indicates that the NF supports the source PLMN (e.g. includes the source VPLMN ID as supported PLMN), or indicates that it acts as default NF or indicates that it supports any PLMN. If this is true for the NF profile of any NF registered with the target PLMN NRF 603 the target PLMN NRF 603 selects that NF.

In 608, the target PLMN NRF 603 provides the selected NF information (e.g. FQDN of a selected NF/service) to the serving PLMN NRF 602 and in 609 the serving PLMN NRF 602 forwards the information of the selected NF to the NF Service Consumer 601.

It should be noted that it is only one possible example that discovery and selection (based on a registration) is performed by an NRF.

Alternatively, for example, discovery and selection may also be based on an SCP (Service Communication Proxy) according to the delegated discovery mechanism introduced in 3GPP Release 16 eSBA (Signalling Security Enhancements). In that case, procedures as explained with reference to FIGS. 4 to 6 may be performed but the (target PLMN) NRF is replaced with a SCP (delegated discovery function). This means that a service consumer is registered with the SCP (as in FIG. 4 or 5) and the SCP performs discovery explained with reference to FIG. 6.

Figure 7:
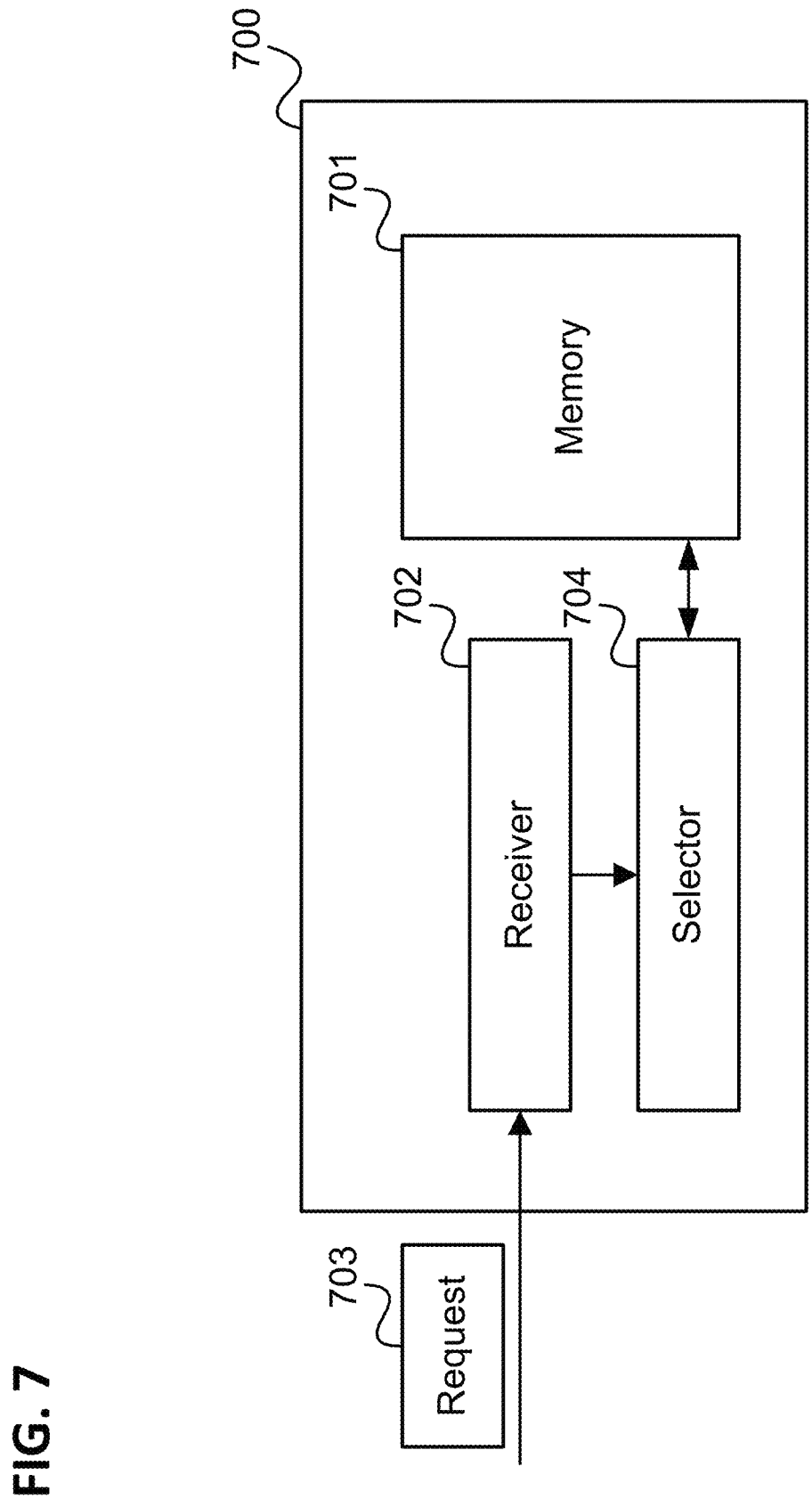
FIG. 7 shows a network function database of a mobile communication network according to an embodiment.

In summary, according to various embodiments, a network function database (e.g. a network repository function or service repository) is provided as illustrated in FIG. 7.

FIG. 7 shows a network function database 700 of a mobile communication network according to an embodiment.

The network function database 700 includes a memory 701 configured to store, for a network function or service of the mobile communication network, an indication that the network function or service is configured to take over serving mobile terminals served by one of one or more other mobile communication networks.

The network function database 700 further includes a receiver 702 configured to receive, from another mobile radio communication network (which may or may not be one of the one or more other mobile communication networks), a request 703 for selecting a network function to take over serving a mobile terminal served by the other mobile communication network.

Further, the network function database 700 includes a selector 704 configured to select the network function or service for taking over serving the mobile terminal for which the memory stores the indication that the network function or service is configured to take over serving mobile terminals served by one of one or more other mobile communication networks if the one or more other mobile communication networks include the other mobile communication network serving the mobile terminal.

It should be noted that in the above, reference is made to "network function or service" since a NF may include one or more services. In Release 16, these Services can be placed/run independently e.g. in different containers. For example, an indication that a network function service is configured to take over serving mobile terminals served by one of one or more other mobile communication networks may only apply to a subset of the services of the network function. Accordingly, when reference is made in any one of the examples to a "network function" this may also be understood to refer to a network function service, i.e. a service included of (provided by) a network function. In particular the embodiments described above, for simplicity, refer to a network function without differentiating possible services within the network function. In this context a service of a network function may be referred to as "network function service" ("NF service") as in Release 15 or just as "service" as in Release 16. It should furthermore be noted that service or NF service may be understood as a service of a service producer and the selection of a network function for a service is a selection of a service producer. "Network Function" and "Service" or "Network Function Service" as well as related terms may be understood according to 3GPP, e.g. Release 15 or Release 16.

According to various embodiments, in other words, each of one or more network functions are stored in the network function database together with an indication which (if any) other mobile communication networks they support with regard to continuing a service for a mobile terminal (e.g. a user equipment UE) provided by (one of) the other mobile communication networks but for example discontinued by the other mobile communication network due to a handover to the mobile communication network. Based on these indications, which may be stored in any format, e.g. in terms of one or more bits (e.g. one or more flags), references to PLMN lists or also group associations of the network functions, the network function database selects a network function for taking over serving (i.e. continuing a service for) a mobile terminal.

The indication may be stored in a memory based on network functions or services registering or providing information about the indication of supporting other mobile communication networks to the network function database. The network function database may include a receiver to receiver corresponding registering messages or registering information.

The network function may for example be an AMF in visited PLMN as in the examples above. However, other applications of the approach of FIG. 7 are possible. For example, it may also be applied for the selection of an SMF in a home network, e.g. for a home routed session like illustrated in FIG. 2. The other mobile communication network would then be a visited network (e.g. first VPLMN 201) and the mobile communication network would be the home network (e.g. HPLMN 208). The service by the other mobile communication network would then not be discontinued but nevertheless the SMF would take over serving the mobile terminal (e.g. UE 201). The communication service would then be provided via both the visited network and the home network as illustrated in FIG. 2 for the home routed session running via the first VPLMN 202 to the HPLMN 208.

The indication may for example be provided to the network function data by a service consumer registration for the network function, for example including an indication that the network function is a default network function (or provides the default network service) and/or a list of supported PLMNs.

The approach of FIG. 7 may for example be applied for handling discovery and selection of a target NF in a target PLMN in case of inter-PLMN mobility. Based on the approach of FIG. 7, a target visited communication network (e.g. a PLMN) may select a network function such as an AMF in a handover or a registration for mobility scenario.

The network function database 700 for example carries out a method as illustrated in FIG. 8.

FIG. 8 shows a flow diagram 800 illustrating a method for selecting a network function of the mobile communication network.

In 801, for a network function of the mobile communication network, an indication that the network function is configured to take over serving mobile terminals served by one of one or more other mobile communication networks is stored.

In 802, a request for selecting a network function to take over serving a mobile terminal served by the other mobile communication network is received from another mobile radio communication network.

In 803, the network function, for which the indication that the network function is configured to take over serving mobile terminals served by one of one or more other mobile communication networks is stored, is selected for taking over serving the mobile terminal if the one or more other mobile communication networks include the other mobile communication network serving the mobile terminal.

The components of the network function database (as well as the network function and other devices mentioned herein) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions described above may also be understood as a "circuit".

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A system of a second mobile communication network comprising:
    a memory that stores, for a network function of the second mobile communication network, an indication comprising an indication that the network function is a network function that takes over serving mobile terminals served by a network function of a first mobile communication network included in one of one or more other mobile communication networks;
    a receiver that receives, from the first mobile communication network, a request for selecting a network function to take over serving a mobile terminal served by the network function of the first mobile communication network; and a selector that selects a network function stored in the memory, based on the request, for taking over serving the mobile terminal, wherein the selector searches the memory for a network function that is indicated as being configured to take over serving the mobile terminals served by the first mobile communication network, and selects the network function found as the network function to take over serving the mobile terminal.

2. The system according to claim 1, wherein the indication comprises a list of identifications of the one or more other mobile communication networks.

3. The system according to claim 1, wherein the indication comprises an indication that the network function comprises an interface to the one or more other mobile communication networks.

4. The system according to claim 1, wherein the indication comprises a list of identifications of supported slices of the one or more other mobile communication networks.

5. The system according to claim 1, wherein the selector searches the memory for a network function that is indicated as being configured to take over the serving mobile terminals served by the first mobile communication network by means of a list of identifications including an identification of the first mobile communication network or an identification of a slice of the first mobile communication network, and selects a network function found as a network function to take over serving the mobile terminal.

6. The system according to claim 5, wherein the selector searches, if it cannot find a network function that is indicated as being configured to take over the serving mobile terminals served by the first mobile communication network by means of a list of identifications including the first mobile communication network, a network function that is indicated as a network function for taking over the serving mobile terminals served by the first mobile communication network.

7. The system according to claim 1, wherein the network function is an Access and Mobility Management Function of the second mobile communication network.

8. The system according to claim 1, wherein the second mobile communication network, the one or more other mobile communication networks, and the first mobile communication network serving the mobile terminal are visited networks of the mobile terminal or comprises visited networks and a home network of the mobile terminal.

9. The system according to claim 1, wherein the first mobile communication network serves the mobile terminal by means of a home routed session or a local breakout session.

10. The system according to claim 1, wherein the system comprises a network repository function or a service communication proxy.

11. The system according to claim 2, wherein the selector searches the memory for the network function that is indicated as being configured to take over serving mobile terminals served by the first mobile communication network by means of a list of identifications including an identification of the first mobile communication network or an identification of a slice of the first mobile communication network, and selects a network function found as a network function to take over serving the mobile terminal.

12. The system according to claim 3, wherein the selector searches the memory for the network function that is indicated as being configured to take over serving mobile terminals served by the first mobile communication network by means of a list of identifications including an identification of the first mobile communication network or an identification of a slice of the first mobile communication network, and selects a network function found as a network function to take over serving the mobile terminal.

13. The system according to claim 4, wherein the selector searches the memory for the network function that is indicated as being configured to take over serving mobile terminals served by the first mobile communication network by means of a list of identifications including an identification of the first mobile communication network or an identification of a slice of the first mobile communication network, and selects a network function found as a network function to take over serving the mobile terminal.

14. A method for selecting a network function of a second mobile communication network comprising:

storing, for a network function of the second mobile communication network, an indication comprising an indication that the network function is a network function that takes over serving mobile terminals served by a network function of a first mobile communication network included in one of one or more other mobile communication networks;

receiving, from the first mobile communication network, a request for selecting a network function to take over serving the mobile terminal served by the network function of the first mobile communication network;

selecting a network function, stored in the memory, based on the request, for taking over serving the mobile terminal; and searching the memory for a network function that is indicated as being configured to take over serving the mobile terminals served by the first mobile communication network, and selecting the network function found as the network function to take over serving the mobile terminal.

* * * * *